US011329300B2

(12) United States Patent
Suzuki et al.

(10) Patent No.: US 11,329,300 B2
(45) Date of Patent: May 10, 2022

(54) FUEL CELL SYSTEM

(71) Applicant: TOYOTA JIDOSHA KABUSHIKI KAISHA, Toyota (JP)

(72) Inventors: Yushi Suzuki, Okazaki (JP); Koro Fujio, Toyota (JP); Shuji Kurita, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 194 days.

(21) Appl. No.: 16/601,003

(22) Filed: Oct. 14, 2019

(65) Prior Publication Data

US 2020/0168925 A1 May 28, 2020

(30) Foreign Application Priority Data

Nov. 27, 2018 (JP) .............................. JP2018-221503

(51) Int. Cl.
H01M 8/04082 (2016.01)
H01M 8/04746 (2016.01)
B01D 45/16 (2006.01)
B01F 3/02 (2006.01)
B01F 5/06 (2006.01)

(52) U.S. Cl.
CPC ........ *H01M 8/04201* (2013.01); *B01D 45/16* (2013.01); *B01F 3/02* (2013.01); *B01F 5/0614* (2013.01); *H01M 8/04753* (2013.01); *B01F 2215/0098* (2013.01)

(58) Field of Classification Search
CPC ......... H01M 8/04201; H01M 8/04753; H01M 8/04082; H01M 8/0662; H01M 8/04097; H01M 8/04291; H01M 8/2483; H01M 8/04089; B01F 5/0614; B01F 3/02; B01F 2215/0098; B01D 45/16; Y02E 60/50
See application file for complete search history.

(56) References Cited

U.S. PATENT DOCUMENTS

| | | | |
|---|---|---|---|
| 2008/0056065 A1* | 3/2008 | Keller | B01F 5/0615 366/339 |
| 2017/0117564 A1* | 4/2017 | Hatakeda | H01M 8/241 |
| 2018/0250620 A1 | 9/2018 | Vingelven et al. | |
| 2019/0267659 A1 | 8/2019 | Kurita et al. | |

FOREIGN PATENT DOCUMENTS

| | | |
|---|---|---|
| JP | 2001143732 A | 5/2001 |
| JP | 2009129814 A | 6/2009 |
| JP | 2009164136 A | 7/2009 |
| JP | 2014078428 A | 5/2014 |
| JP | 2019145427 A | 8/2019 |

* cited by examiner

*Primary Examiner* — Muhammad S Siddiquee

(74) *Attorney, Agent, or Firm* — Hunton Andrews Kurth LLP

(57) ABSTRACT

A fuel cell system includes a fuel cell stack, a mixed gas supply passage, and an agitation mixer. The fuel cell stack includes a plurality of fuel cells each including a power generation portion. The fuel cells are stacked. The mixed gas supply passage is configured to communicate with the fuel cell stack. The mixed gas supply passage is configured to supply a mixed gas to the fuel cell stack. The mixed gas is a mixture of a fuel gas and a fuel off-gas that has been discharged from the fuel cell stack. The agitation mixer is provided in the mixed gas supply passage. The agitation mixer is configured to apply a swirling force to the mixed gas. The agitation mixer includes a guide rib configured to guide liquid water contained in the mixed gas to a side opposite to the power generation portion-side.

7 Claims, 7 Drawing Sheets

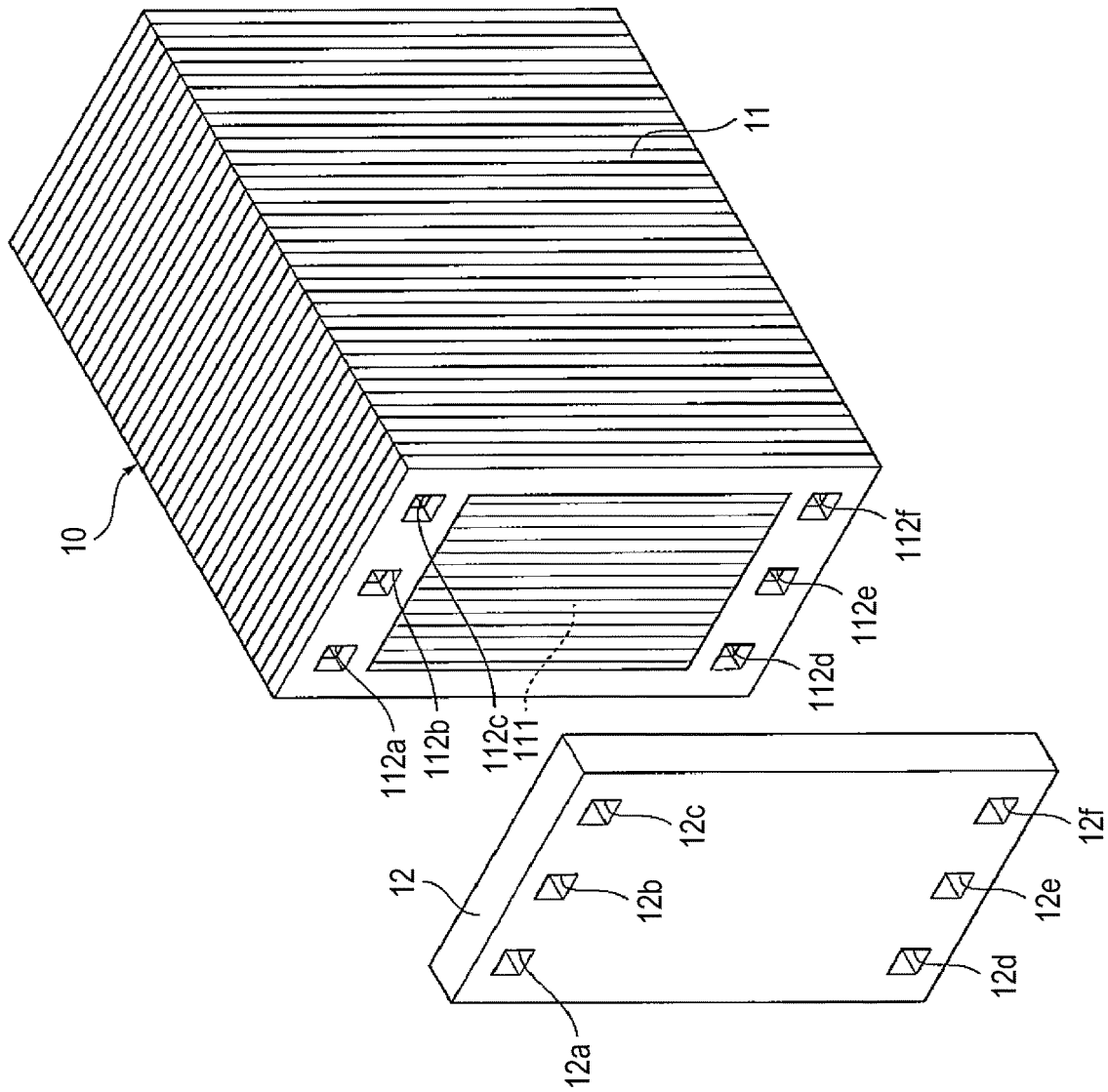

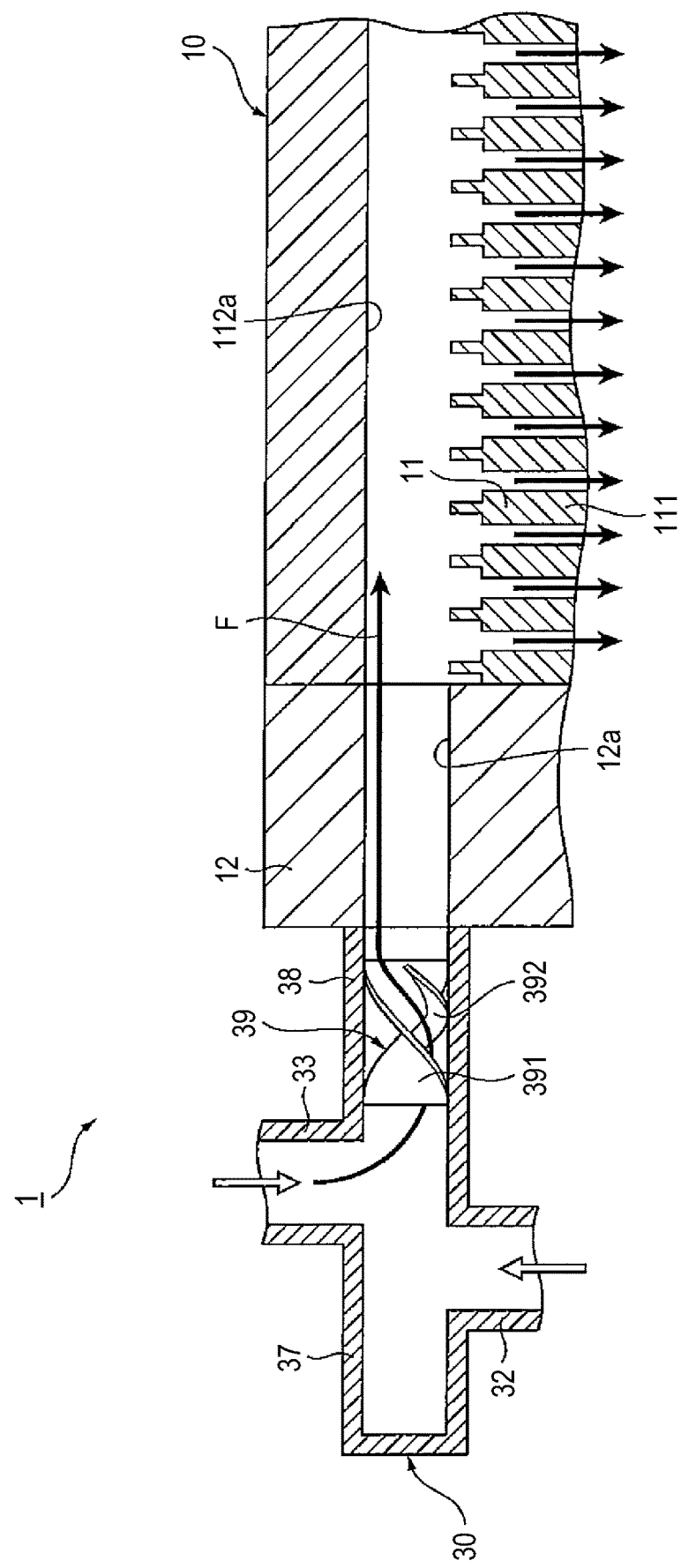

FUEL CELL SYSTEM

INCORPORATION BY REFERENCE

The disclosure of Japanese Patent Application No. 2018-221503 filed on Nov. 27, 2018, including the specification, drawings and abstract is incorporated herein by reference in its entirety.

BACKGROUND

1. Technical Field

The disclosure relates to a fuel cell system.

2. Description of Related Art

Examples of conventional fuel cell systems include a fuel cell system including a fuel cell stack, a fuel gas supply passage, and a circulation passage. The fuel cell stack includes a plurality of fuel cells that are stacked. Through the fuel gas supply passage, a fuel gas, such as hydrogen, is supplied to the fuel cell stack. Through the circulation passage, a fuel off-gas (i.e., an unconsumed fuel gas) discharged from the fuel cell stack is recirculated back into the fuel gas supply passage. In the fuel cell system having the foregoing configuration, the fuel off-gas flowing through the circulation passage may contain liquid water that is composed of generated water and condensed water and that cannot be separated from gas by a gas-liquid separator. If the liquid water enters the inside of the fuel cell stack along with a flow of the fuel gas, the power generation performance of the fuel cells deteriorates.

In order to address the foregoing issue, various measures have been formulated. For example, Japanese Unexamined Patent Application Publication No. 2009-164136 (JP 2009-164136 A) describes a fuel cell system in which a fuel gas and a fuel off-gas are introduced into a fuel gas supply passage, a flow is forcibly generated to agitate and thereby uniformly disperse liquid water contained in the fuel off-gas, and then the gas containing the uniformly dispersed liquid water is supplied to a fuel cell stack (see, for example, paragraph 0102 of JP 2009-164136 A).

SUMMARY

In the fuel cell system described above, a flow generated by an inflow of the fuel off-gas is a spiral flow with respect to the fuel gas supply passage. Thus, the liquid water contained in the fuel off-gas may be concentrated at a fuel cell inlet.

The disclosure provides a fuel cell system configured to restrain liquid water from being concentrated at a fuel cell inlet.

An aspect of the disclosure relates to a fuel cell system including a fuel cell stack, a mixed gas supply passage, and an agitation mixer. The fuel cell stack includes a plurality of fuel cells each including a power generation portion. The fuel cells are stacked. The mixed gas supply passage is configured to communicate with the fuel cell stack. The mixed gas supply passage is configured to supply a mixed gas to the fuel cell stack. The mixed gas is a mixture of a fuel gas and a fuel off-gas that has been discharged from the fuel cell stack. The agitation mixer is provided in the mixed gas supply passage. The agitation mixer is configured to apply a swirling force to the mixed gas. The agitation mixer includes a guide rib configured to guide liquid water contained in the mixed gas to a side opposite to the power generation portion-side.

In the fuel cell system according to the foregoing aspect, the agitation mixer includes the guide rib configured to guide the liquid water contained in the mixed gas to the side opposite to the power generation portion-side. With this configuration, the liquid water contained in the mixed gas is guided by the guide ribs, thereby moving in a direction toward the side opposite to a fuel cell inlet. Thus, it is possible to restrain the liquid water from being concentrated at the fuel cell inlet.

In the fuel cell system according to the foregoing aspect, each of the fuel cells may include a fuel gas inlet communication hole, the power generation portion may be disposed at a central position of each of the fuel cells, the fuel gas inlet communication hole may be provided in a region around the power generation portion, the fuel gas inlet communication holes of the fuel cells that are stacked may communicate with each other, and the mixed gas supplied through the mixed gas supply passage may flow to the power generation portions through the fuel gas inlet communication holes that communicate with each other.

In the fuel cell system according to the foregoing aspect, the agitation mixer may include a mixer body having a spiral shape, a shape of the guide rib may be defined so as to follow the spiral shape of the mixer body, and the spiral shape of the mixer body may be defined such that a flow of the mixed gas is guided to the side opposite to the power generation portion-side.

In the fuel cell system according to the foregoing aspect, the mixed gas supply passage may communicate with the fuel gas inlet communication hole of each of the fuel cells through a fuel gas inlet communication hole provided in an end plate disposed at one end of the fuel cell stack in a cell stacking direction, and the agitation mixer may be fixedly provided in the mixed gas supply passage, at a position on a side of the fuel gas inlet communication hole of the end plate.

According to the foregoing aspect, it is possible to restrain the liquid water from being concentrated at the fuel cell inlet.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a perspective view illustrating a fuel cell stack and a stack manifold;

FIG. 3 is a schematic view illustrating the arrangement of an agitation mixer and a guide rib;

DETAILED DESCRIPTION OF EMBODIMENTS

Figure 1:
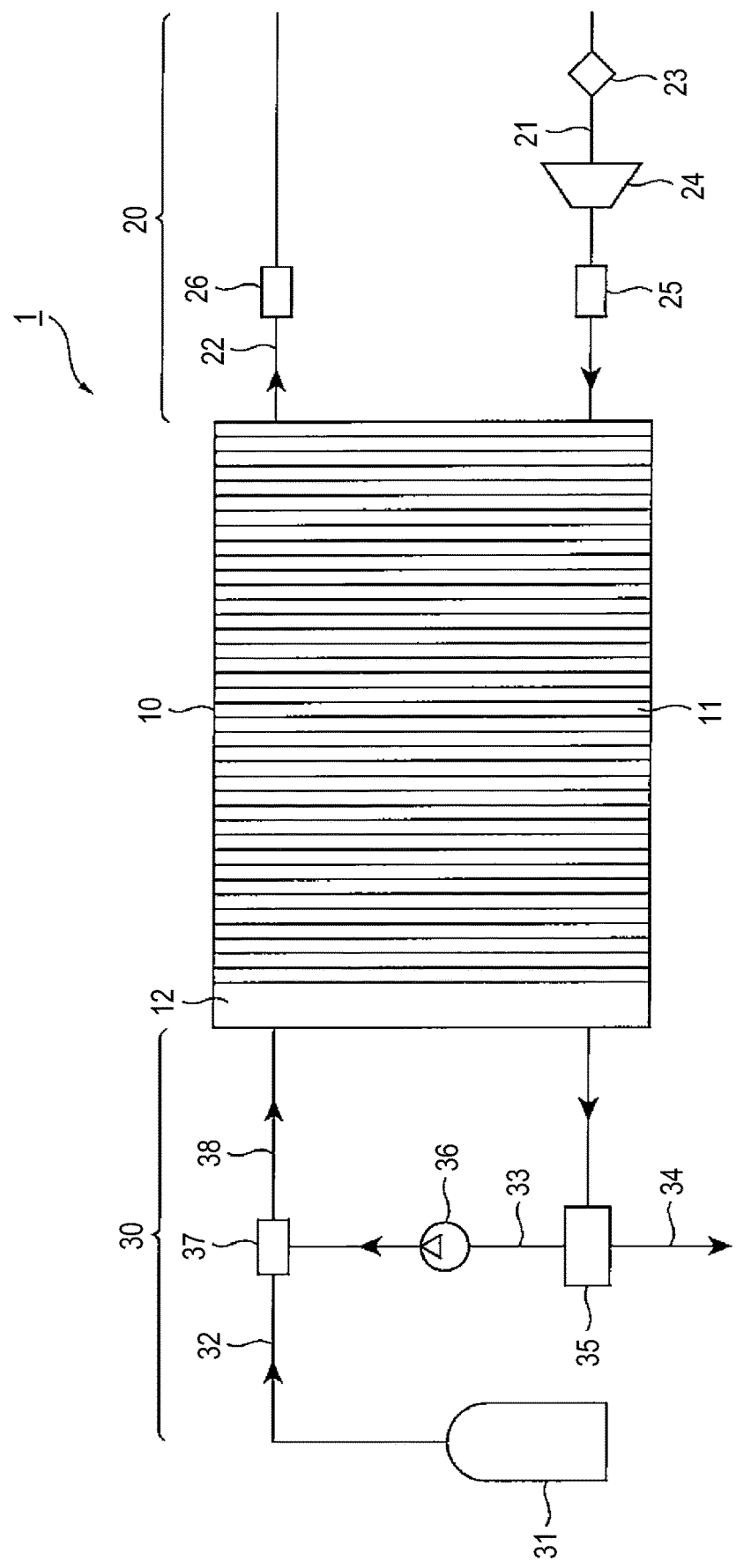
FIG. 1 is a schematic configuration diagram of a fuel cell system according to a first embodiment.

Hereinafter, fuel cell systems according to example embodiments of the disclosure will be described with reference to the accompanying drawings. In the description of the drawings, the same elements will be denoted by the same reference numerals, and detailed descriptions thereof will not be repeated. The fuel cell system according to each embodiment of the disclosure may be mounted in a vehicle, a ship, an aircraft, a train, or the like, to be used as a drive source, or may be used as a power generation facility of a building.

First Embodiment

FIG. 1 is a schematic configuration diagram of a fuel cell system according to a first embodiment. FIG. 2 is a perspective view illustrating a fuel cell stack and a stack manifold. A fuel cell system 1 of the present embodiment includes, as main components, a fuel cell stack 10, an oxidant gas supply system 20 that supplies an oxidant gas, such as air, to the fuel cell stack 10, and a fuel gas supply system 30 that supplies a fuel gas, such as hydrogen, to the fuel cell stack 10.

The fuel cell stack 10 is a cell stack including a plurality of fuel cells 11 that are stacked. The fuel cell stack 10 is a solid polymer electrolyte fuel cell. Although not illustrated, each of the fuel cells 11 includes a membrane electrode assembly (MEA) including, for example, an ion-permeable electrolyte membrane, and an anode catalyst layer (an anode electrode) and a cathode catalyst layer (a cathode electrode) between which the electrolyte membrane is held. Each fuel cell 11 further includes a pair of separators (i.e., an anode separator and a cathode separator) between which the MEA is held.

In some cases, gas diffusion layers (GDLs) are provided respectively on opposite sides of the MEA. One of the GDLs is used to provide the fuel gas, and the other one of the GLDs is used to provide the oxidant gas. The GDLs are also used to collect electricity generated by an electrochemical reaction. In this case, the MEA with the GDLs provided respectively on the opposite sides of the MEA is referred to as a membrane electrode and gas diffusion layer assembly (MEGA). The MEGA is held between the anode separator and the cathode separator. When the MEGA including the gas diffusion layers is used, the MEGA serves as a power generation portion 111 of the fuel cell 11. On the other hand, when the MEA including no gas diffusion layer is used, the MEA serves as the power generation portion 111 of the fuel cell 11.

As illustrated in FIG. 2, the power generation portion 111 is disposed at substantially the central position of the fuel cell 11. In the fuel cell 11, a fuel gas inlet communication hole 112a, a refrigerant outlet communication hole 112b, and an oxidant gas outlet communication hole 112c are provided, in this order, on one side (the upper side in FIG. 2) of the power generation portion 111. An oxidant gas inlet communication hole 112d, a refrigerant inlet communication hole 112e, and a fuel gas outlet communication hole 112f are provided, in this order, on the opposite side (the lower side in FIG. 2) of the power generation portion 111 from the one side. The communication holes 112a to 112f are also referred to as manifold holes. Each of the communication holes 112a to 112f has a rectangular shape. The fuel gas inlet communication hole 112a is provided in a region around the power generation portion 111. The fuel gas inlet communication holes 112a of the fuel cells 11 are stacked communicate with each other.

Further, a stack manifold (also referred to as an end plate) 12 is disposed at one end of the fuel cell stack 10 in the cell stacking direction. The stack manifold 12 is made of a metal material, such as aluminum, and has a generally rectangular plate shape. The stack manifold 12 is fixedly fastened to the fuel cell stack 10 with a bolt or the like. In the stack manifold 12, a fuel gas inlet communication hole 12a is provided at a position corresponding to the fuel gas inlet communication hole 112a of each fuel cell 11, a refrigerant outlet communication hole 12b is provided at a position corresponding to the refrigerant outlet communication hole 112b of each fuel cell 11, an oxidant gas outlet communication hole 12c is provided at a position corresponding to the oxidant gas outlet communication hole 112c of each fuel cell 11, an oxidant gas inlet communication hole 12d is provided at a position corresponding to the oxidant gas inlet communication hole 112d of each fuel cell 11, a refrigerant inlet communication hole 12e is provided at a position corresponding to the refrigerant inlet communication hole 112e of each fuel cell 11, and a fuel gas outlet communication hole 12f is provided at a position corresponding to the fuel gas outlet communication hole 112f of each fuel cell 11.

Each of the communication holes 12a to 12f has a rectangular shape, and has the same size as a corresponding one of the communication holes 112a to 112f provided in each fuel cell 11.

As illustrated in FIG. 1, the oxidant gas supply system 20 includes, for example, an oxidant gas supply passage 21 for supplying the oxidant gas to the cathode electrode of each fuel cell 11 of the fuel cell stack 10, and an oxidant gas discharge passage 22 for discharging an oxidant off-gas, which is the oxidant gas that has been supplied to the fuel cell stack 10 and that has been provided for an electrochemical reaction in each fuel cell 11, from the fuel cell stack 10. The oxidant gas supply passage 21 communicates with the oxidant gas inlet communication hole 12d of the stack manifold 12 and the oxidant gas inlet communication hole 112d of each of the fuel cells 11. The oxidant gas discharge passage 22 communicates with the oxidant gas outlet communication hole 12c of the stack manifold 12 and the oxidant gas outlet communication hole 112c of each of the fuel cells 11.

Each of the oxidant gas supply passage 21 and the oxidant gas discharge passage 22 includes, for example, a hose, a pipe, a joint member, and so forth. Further, an air cleaner 23, an air compressor 24, an intercooler 25, a valve, and so forth are provided on the oxidant gas supply passage 21. A muffler 26, a valve, and so forth are provided on the oxidant gas discharge passage 22.

The fuel gas supply system 30 includes, for example, a fuel gas supply source 31 that stores a high-pressure fuel gas, such as hydrogen, a fuel gas supply passage 32 for supplying the fuel gas from the fuel gas supply source 31 to an anode electrode of each fuel cell 11 of the fuel cell stack 10, a circulation passage 33 for recirculating a fuel off-gas (i.e., an unconsumed fuel gas) discharged from the fuel cell stack 10 back into the fuel gas supply passage 32, and a fuel gas discharge passage 34 that is connected to and branches off from the circulation passage 33 so as to discharge the fuel off-gas in the circulation passage 33 to the outside of the fuel cell system 1. Each of the fuel gas supply passage 32, the circulation passage 33, and the fuel gas discharge passage 34 includes, for example, a hose, a pipe, a joint member, and so forth. Although not illustrated, a pressure gauge, an injector, a regulator, a valve, and so forth are provided on the fuel gas supply passage 32.

An upstream-side (i.e., the fuel cell stack 10-side) end portion of the circulation passage 33 communicates with the fuel gas outlet communication hole 12f of the stack manifold 12 and the fuel gas outlet communication hole 112f of each of the fuel cells 11. A gas-liquid separator 35, a hydrogen circulation pump 36, and so forth are provided on the circulation passage 33. The gas-liquid separator 35 separates, from gas, generated water and condensed water (i.e., liquid water) contained in the fuel off-gas flowing through the circulation passage 33, and stores the liquid water. At the gas-liquid separator 35, the fuel gas discharge passage 34 branches off from the circulation passage 33. The hydrogen circulation pump 36 pressurizes and pumps out the fuel off-gas that has been subjected to gas-liquid separation at the gas-liquid separator 35, thereby recirculating the fuel off-gas back into the fuel gas supply passage 32.

The circulation passage 33 is connected to the fuel gas supply passage 32 via a junction pipe 37. The junction pipe 37 merges the fuel gas supplied from the fuel gas supply source 31 with the fuel off-gas supplied from the circulation passage 33, and then delivers the mixed gas to the fuel cell stack 10. Thus, the fuel gas supplied from the fuel gas supply source 31 and the fuel off-gas supplied from the circulation passage 33 are mixed in the junction pipe 37 to be the mixed gas and the mixed gas flows to the fuel cell stack 10 through a mixed gas supply passage 38.

The mixed gas supply passage 38 is a part of the fuel gas supply passage 32, that is, a section of the fuel gas supply passage 32 from the junction pipe 37 to the stack manifold 12. A downstream-side (i.e., the fuel cell stack 10-side) end portion of the mixed gas supply passage 38 communicates with the fuel gas inlet communication hole 12a of the stack manifold 12 and the fuel gas inlet communication hole 112a of each of the fuel cells 11. That is, the mixed gas supply passage 38 communicates with the fuel gas inlet communication hole 112a of each of the fuel cells 11 through the fuel gas inlet communication hole 12a of the stack manifold 12. The mixed gas supplied through the mixed gas supply passage 38 flows to the power generation portions 111 through the fuel gas inlet communication holes 112a that communicate with each other.

Although not illustrated, the fuel cell system 1 of the present embodiment includes a refrigerant supply passage for supplying a refrigerant to the fuel cell stack 10, and a refrigerant discharge passage for recirculating the refrigerant discharged from the fuel cell stack 10 back toward the radiator. The refrigerant supply passage communicates with the refrigerant inlet communication hole 12e of the stack manifold 12 and the refrigerant inlet communication hole 112e of each of the fuel cells 11. The refrigerant discharge passage communicates with the refrigerant outlet communication hole 12b of the stack manifold 12 and the refrigerant outlet communication hole 112b of each of the fuel cells 11.

The fuel cell system 1 of the present embodiment further includes an agitation mixer 39 provided in the mixed gas supply passage 38, and configured to mix the fuel gas and the fuel off-gas together and apply a swirling force to the mixed gas. Specifically, as illustrated in FIG. 3, inside a pipe that defines the mixed gas supply passage 38, the agitation mixer 39 is fixedly provided at a position immediately before (i.e., immediately upstream of) the fuel gas inlet communication hole 12a of the stack manifold 12. That is, the agitation mixer 39 is fixedly provided in the mixed gas supply passage 38, at a position on a side of the fuel gas inlet communication hole 12a of the stack manifold 12.

Figure 4A:
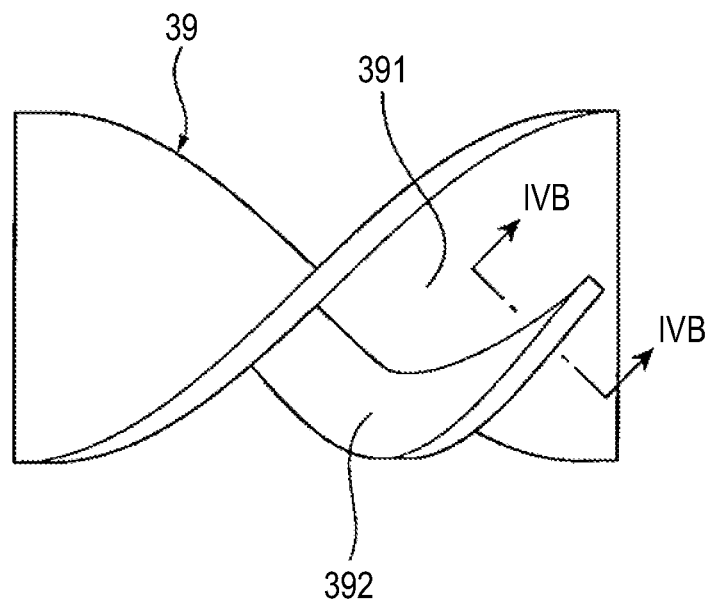
FIG. 4A is a plan view of the agitation mixer.
Figure 4B:
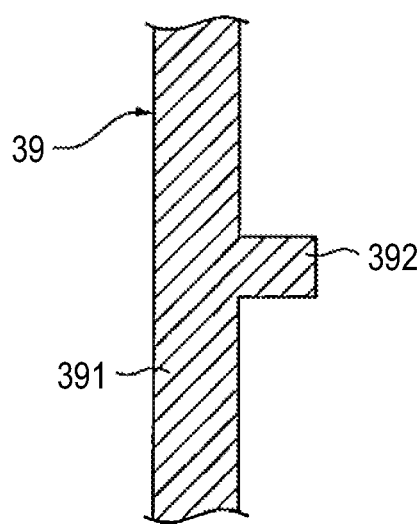
FIG. 4B is a sectional view taken along line IVB-IVB in FIG. 4A.

Hereinafter, the configuration of the agitation mixer 39 will be described with reference to FIG. 4A and FIG. 4B. FIG. 4A is a plan view of the agitation mixer 39. FIG. 4B is a sectional view taken along line IVB-IVB in FIG. 4A. The agitation mixer 39 includes a mixer body 391 having a spiral shape, and a guide rib 392. The mixer body 391 is formed by, for example, twisting a single thin plate. The guide rib 392 is provided along the spiral shape of the mixer body 391. The spiral shape of the mixer body 391 is defined such that a flow of the mixed gas is guided to a side (an upper side in FIG. 3) opposite to the power generation portion 111-side. More specifically, the spiral shape of the mixer body 391 is defined such that a flow of the mixed gas is guided to a region of the fuel gas inlet communication hole 112a, the region being on a side opposite to the power generation portion 111-side in the up-down direction in FIG. 3.

The guide rib 392 has an elongated shape. The guide rib 392 radially protrudes from a surface of the mixer body 391, which is on the spiral central axis-side. The guide rib 392 extends over the entire length of the mixer body 391. The shape of the guide rib 392 is defined so as to follow the spiral shape of the mixer body 391 such that the liquid water contained in the mixed gas is guided to the side opposite to the power generation portion 111-side. As illustrated in FIG. 4B, the guide rib 392 has a rectangular cross section, and is integral with the mixer body 391.

The mixer body 391 and the guide rib 392 of the agitation mixer 39 having the foregoing configuration are formed by resin molding such that the mixer body 391 and the guide rib 392 are integral with each other. Alternatively, the agitation mixer 39 may be formed by fixedly bonding the guide rib 392, which has been prepared separately from the mixer body 391, to the mixer body 391.

In the fuel cell system 1 configured as described above, because the agitation mixer 39 includes the guide rib 392 configured to guide the liquid water contained in the mixed gas to the side opposite to the power generation portion 111-side, the liquid water contained in the mixed gas is guided by the guide rib 392, thereby moving in a direction toward the side opposite to a fuel cell inlet, as indicated by an arrow F in FIG. 3. Note that, "fuel cell inlet" means an upper-side (the fuel gas inlet communication hole 112a-side) end portion of a clearance between the closest fuel cell 11 to the fuel gas inlet communication hole 12a of the stack manifold 12 illustrated in FIG. 3 and the second closest fuel cell 11 to the fuel gas inlet communication hole 12a. With this configuration, it is possible to restrain the liquid water from being concentrated at the fuel cell inlet, thereby reducing deterioration of the power generation performance due to entry of the liquid water.

The agitation mixer 39 including the guide rib 392 is provided in the mixed gas supply passage 38, at a position immediately before (i.e., immediately upstream of) the fuel gas inlet communication hole 12a. With this configuration, the liquid water contained in the mixed gas can be efficiently guided to the side opposite to the power generation portion 111-side.

Second Embodiment

Figure 5A:
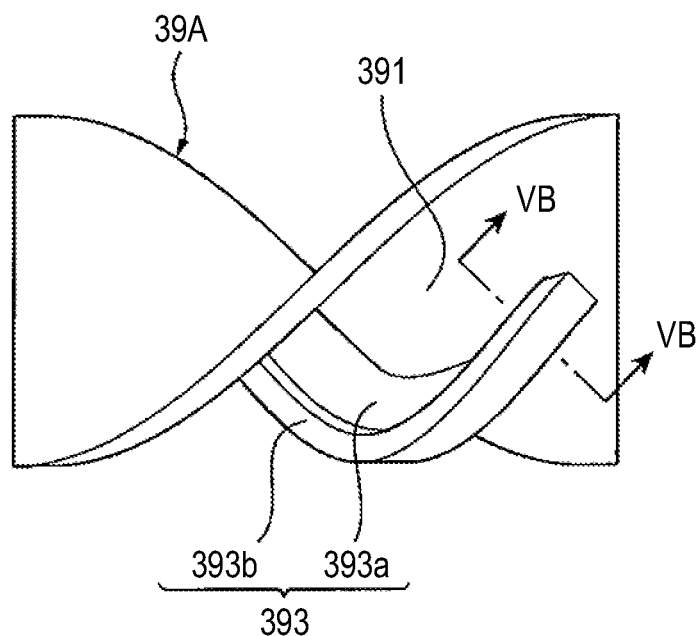
FIG. 5A is a plan view of an agitation mixer according to a second embodiment.
Figure 5B:
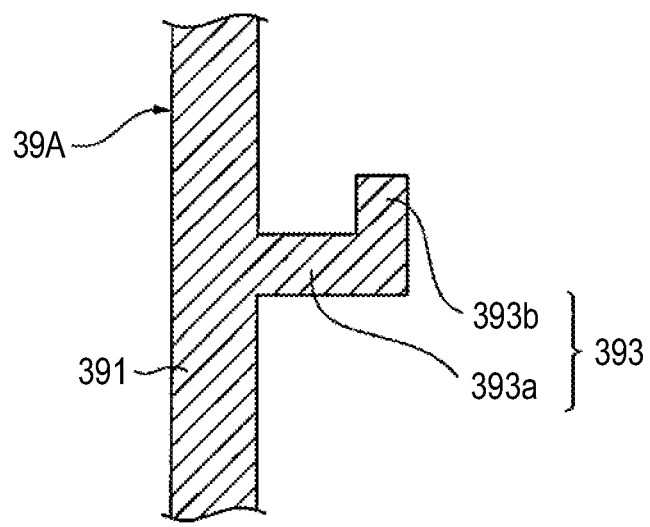
FIG. 5B is a sectional view taken along line VB-VB in FIG. 5A.

Hereinafter, a fuel cell system according to a second embodiment will be described with reference to FIG. 5A and FIG. 5B. FIG. 5A is a plan view of an agitation mixer 39A according to the second embodiment. FIG. 5B is a sectional view taken along line VB-VB in FIG. 5A. Although the fuel cell system according to the present embodiment is different from that of the first embodiment in the shape of the guide rib of the agitation mixer, the other configurations are the same as those of the first embodiment. Therefore, detailed description of the same configurations as those in the first embodiment will be omitted.

Specifically, as illustrated in FIG. 5A, the agitation mixer 39A includes a mixer body 391 having a spiral shape, and a guide rib 393. The mixer body 391 is formed by, for example, twisting a single thin plate. The guide rib 393 is provided along the spiral shape of the mixer body 391. The guide rib 393 extends over the entire length of the mixer body 391 such that the guide rib 393 guides the liquid water contained in the mixed gas to the side opposite to the power generation portion 111-side.

As illustrated in FIG. 5B, the guide rib 393 has an L-shaped cross section, and includes a base end portion 393a protruding radially from the mixer body 391, and a bent portion 393b bent from a distal end of the base end portion 393a so as to be orthogonal to the guide rib 393. The bent portion 393b is bent toward the spiral central axis of the mixer body 391. The mixer body 391 and the guide rib 393 of the agitation mixer 39A having the foregoing configuration are formed by resin molding such that the mixer body 391 and the guide rib 393 are integral with each other.

The fuel cell system of the present embodiment produces, in addition to the same advantageous effects as those of the first embodiment, the following advantageous effects. The guide rib 393 of the agitation mixer 39A includes the base end portion 393a radially protruding from the mixer body 391 and the bent portion 393b that is orthogonal to the base end portion 393a. Thus, a corner portion defined by the base end portion 393a and the bent portion 393b performs a function of catching the liquid water. With this configuration, it is possible to further enhance the advantageous effect of restraining the liquid water from being concentrated at the fuel cell inlet.

In order to verify the advantageous effects of the disclosure, the inventors of the present disclosure produced a model of an agitation mixer including no guide rib (Comparative Example), a model of an agitation mixer including a guide rib having the same configuration as that in the first embodiment (Example 1), and a model of an agitation mixer including a guide rib having the same configuration as that in the second embodiment (Example 2), applied each of the produced models to the fuel cell system 1, and then analyzed, for each of the produced models, the amount of liquid water at the fuel cell inlet using the fluid analysis software Fluent (manufactured by ANSYS Japan K.K.).

Figure 6:
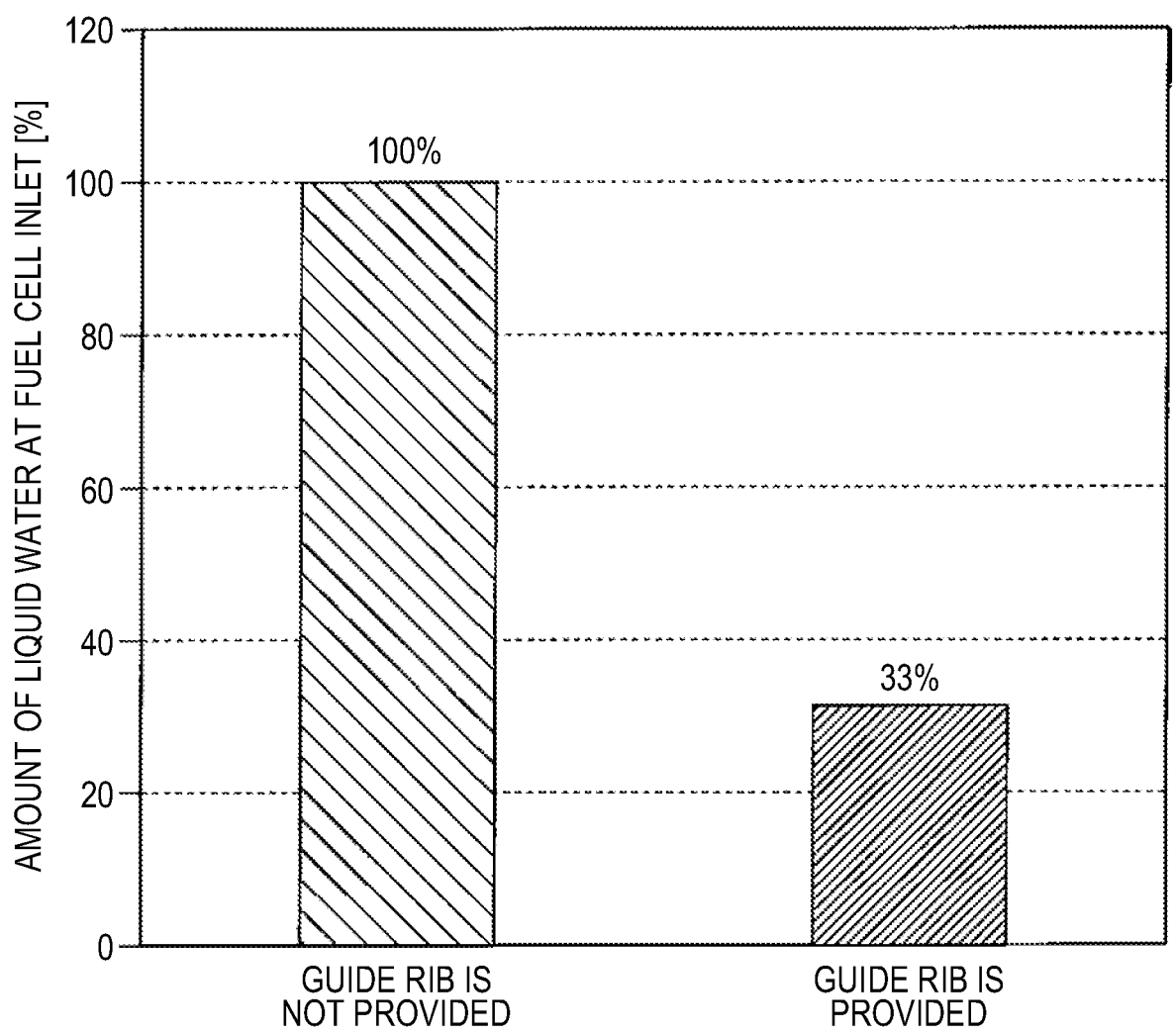
FIG. 6 is a graph illustrating analysis results obtained in Example 1 and Comparative Example.

FIG. 6 is a graph illustrating analysis results obtained in Example 1 and Comparative Example. As illustrated in FIG. 6, it was found out that the amount of liquid water at the fuel cell inlet was decreased by 67% in Example 1, as compared to that in Comparative Example. The analysis results have proven that providing the agitation mixer with the guide rib makes it possible to restrain the liquid water from being concentrated at the fuel cell inlet.

Figure 7:
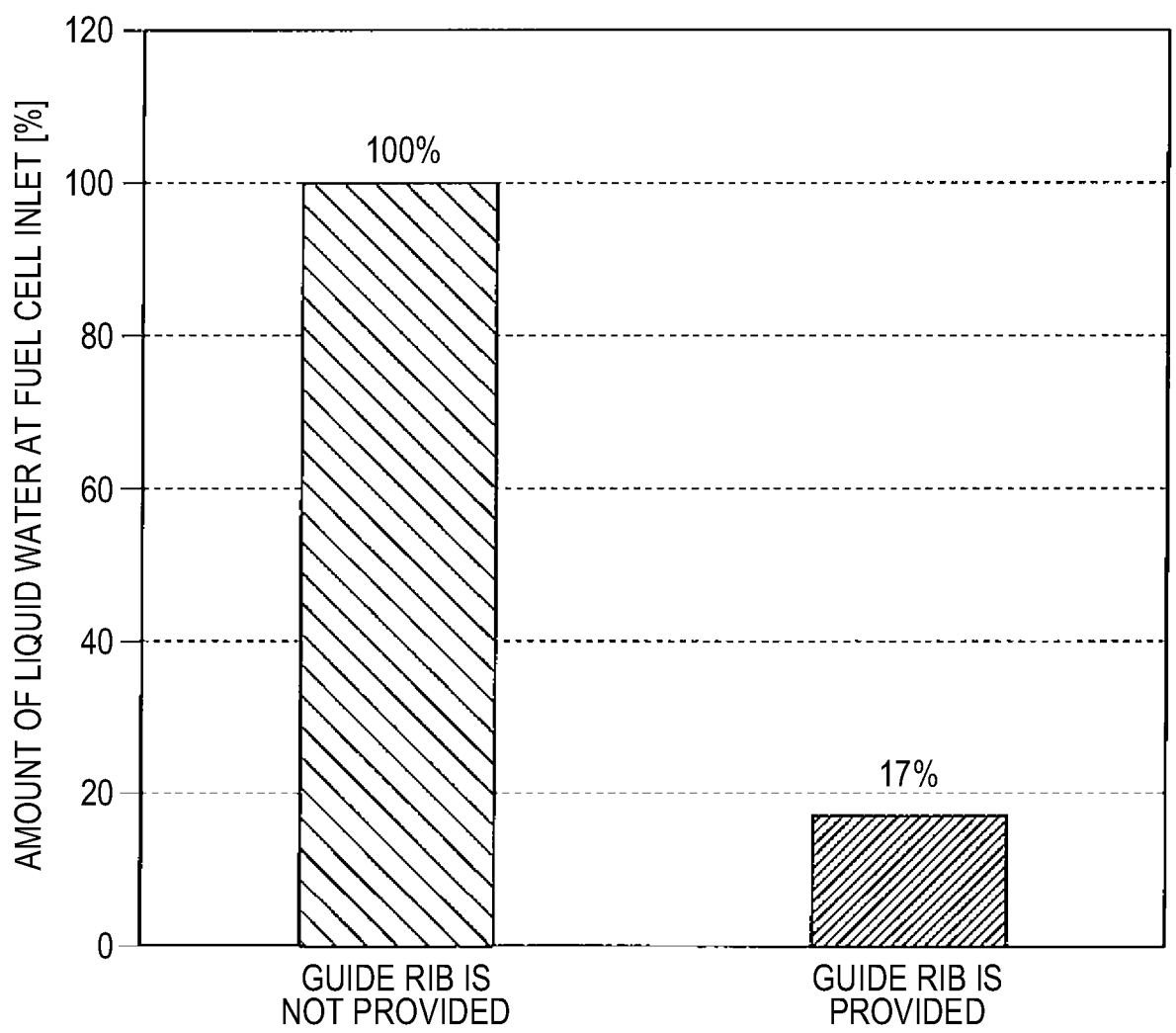
FIG. 7 is a graph illustrating analysis results obtained in Example 2 and Comparative Example.

FIG. 7 is a graph illustrating analysis results obtained in Example 2 and Comparative Example. As illustrated in FIG. 7, it was found out that the amount of liquid water at the fuel cell inlet was decreased by 83% in Example 2, as compared to that in Comparative Example. The analysis results have proven that providing the agitation mixer with the guide rib makes it possible to restrain the liquid water from being concentrated at the fuel cell inlet. Furthermore, it was found out that the amount of liquid water at the fuel cell inlet in Example 2 was smaller than that in Example 1. Therefore, as described in the second embodiment, the analysis results have proven that the liquid water is caught in the corner portion defined by the base end portion and the bent portion of the guide rib to further enhance the advantageous effect of restraining the liquid water from being concentrated at the fuel cell inlet.

While the example embodiments of the disclosure have been described in detail, the disclosure is not limited to the foregoing embodiments, and various design changes may be made to the foregoing embodiments without departing from the technical scopes of the appended claims. For example, in the fuel cell stack, a dummy cell (non-power generation cell) may be further provided at a position adjacent to the stack manifold. In this case as well, the same advantageous effects as those of the foregoing embodiments can be obtained.

In the foregoing embodiments, the guide rib has a rectangular cross section or an L-shaped cross section. However, the cross-sectional shape of the guide rib is not limited to rectangular shape or an L-shape, and may be an arc-shape or a crescent-shape. The guide rib may be provided on an inner wall of the junction pipe (at a position of the agitation mixer) instead of being provided on the mixer body, or may be provided on an inner wall of the mixed gas supply pipe, at a position corresponding to the agitation mixer. The configuration of the fuel cell system is not limited to that described above. For example, a filter for removing impurities may be provided in the mixed gas supply passage, at a position upstream of the agitation mixer.

What is claimed is:

1. A fuel cell system comprising:
a fuel cell stack including a plurality of fuel cells each including a power generation portion, the fuel cells being stacked;
a junction pipe connected a fuel gas supply passage with a circulation passage, the junction pipe merges a fuel gas supplied from the fuel gas supply passage with a fuel off-gas supplied from the circulation passage, and the fuel gas supplied from the fuel gas supply passage and the fuel off-gas supplied from the circulation passage are mixed in the junction pipe;
a mixed gas supply passage being a section of the fuel gas supply passage from the junction pipe to the fuel cell stack and configured to communicate with the fuel cell stack, the mixed gas supply passage being configured to supply a mixed gas to the fuel cell stack; and
an agitation mixer provided in the mixed gas supply passage, the agitation mixer being configured to further mix the fuel gas supplied from the fuel gas supply passage and the fuel off-gas supplied from the circulation passage by applying a swirling force to the mixed gas and supply the mixed gas to the fuel cell stack,
wherein the agitation mixer includes a guide rib configured to guide liquid water contained in the mixed gas to a side opposite to the power generation portion-side.

2. The fuel cell system according to claim 1, wherein:
each of the fuel cells includes a fuel gas inlet communication hole;
the power generation portion is disposed at a central position of each of the fuel cells, and the fuel gas inlet communication hole is provided in a region around the power generation portion;
the fuel gas inlet communication holes of the fuel cells that are stacked communicate with each other; and
the mixed gas supplied through the mixed gas supply passage flows to the power generation portions through the fuel gas inlet communication holes that communicate with each other.

3. The fuel cell system according to claim 1, wherein:
the agitation mixer includes a mixer body having a spiral shape, and a shape of the guide rib is defined so as to follow the spiral shape of the mixer body; and
the spiral shape of the mixer body is defined such that a flow of the mixed gas is guided to the side opposite to the power generation portion-side.

4. The fuel cell system according to claim 2, wherein:
the mixed gas supply passage communicates with the fuel gas inlet communication hole of each of the fuel cells through a fuel gas inlet communication hole provided in an end plate disposed at one end of the fuel cell stack in a cell stacking direction; and
the agitation mixer is fixedly provided in the mixed gas supply passage, at a position on a side of the fuel gas inlet communication hole of the end plate.

5. The fuel cell system according to claim 3, wherein guide rib extends over the entire length of the mixer body.

6. The fuel cell system according to claim 3, wherein the mixer body and the guide rib are formed by resin molding such that the mixer body and the guide rib are integral with each other.

7. A fuel cell system comprising:
a fuel cell stack including a plurality of fuel cells each including a power generation portion, the fuel cells being stacked;
a mixed gas supply passage configured to communicate with the fuel cell stack, the mixed gas supply passage being configured to supply a mixed gas to the fuel cell stack, the mixed gas being a mixture of a fuel gas and a fuel off-gas that has been discharged from the fuel cell stack; and
an agitation mixer provided in the mixed gas supply passage, the agitation mixer being configured to apply a swirling force to the mixed gas,
wherein the agitation mixer comprises a mixer body having a spiral shape, and a guide rib, the guide rib has an L-shaped cross section, and includes a base end portion protruding radially from the mixer body and a bent portion bent from a distal end of the base end portion so as to be orthogonal to the guide rib.

* * * * *